United States Patent [19]
Wieczorek

[11] Patent Number: 6,120,084
[45] Date of Patent: Sep. 19, 2000

[54] COATED PIVOT PIN/DETENT ASSEMBLY

[75] Inventor: Joseph P. Wieczorek, Madison Heights, Mich.

[73] Assignee: Irvin Automotive Products, Inc., Auburn Hills, Mich.

[21] Appl. No.: 08/942,875

[22] Filed: Oct. 2, 1997

[51] Int. Cl.$^7$ ....................................................... B60J 3/02
[52] U.S. Cl. ...................... 296/97.1; 296/97.12; 296/97.9
[58] Field of Search ................... 296/97.1, 97.4, 296/97.9, 97.12, 97.13

[56] References Cited

U.S. PATENT DOCUMENTS

| | | |
|---|---|---|
| 4,489,974 | 12/1984 | Warhol . |
| 4,500,131 | 2/1985 | Fleming ..................................... 296/97 |
| 4,610,477 | 9/1986 | Ebert et al. . |
| 4,617,699 | 10/1986 | Nakamura ............................ 296/97 X |
| 4,620,742 | 11/1986 | Gavagan .................................... 296/97 |
| 4,702,513 | 10/1987 | Ebert et al. . |
| 4,821,374 | 4/1989 | Gavagan . |
| 4,998,767 | 3/1991 | Lawassani et al. . |
| 5,004,289 | 4/1991 | Lanser et al. . |
| 5,007,532 | 4/1991 | Binish . |
| 5,139,303 | 8/1992 | Miller ..................................... 296/97.9 |
| 5,199,132 | 4/1993 | Gabas . |
| 5,251,949 | 10/1993 | Miller et al. ......................... 296/97.12 |
| 5,338,083 | 8/1994 | Gute ...................................... 296/97.9 |
| 5,486,033 | 1/1996 | Lecorvaisier et al. ............... 296/97.13 |
| 5,553,907 | 9/1996 | Finn et al. . |
| 5,603,547 | 2/1997 | Finn et al. . |
| 5,820,197 | 10/1998 | Lanser ................................ 296/97.12 |
| 5,924,748 | 7/1999 | Zapinski ................................ 296/97.1 |

Primary Examiner—Joseph D. Pape
Attorney, Agent, or Firm—Dinnin & Dunn, P.C.

[57] ABSTRACT

A coated pivot pin/detent assembly for use in the manufacture of a molded article. The assembly is coated with a material that adheres to the pivot pin/detent assembly and protects the assembly during the molding process. The coating material also provides lubrication for facilitating movement between the pivot pin and detent.

17 Claims, 2 Drawing Sheets

COATED PIVOT PIN/DETENT ASSEMBLY

BACKGROUND OF THE INVENTION

1. Field of the Invention

The present invention relates generally to a pivot pin assembly to be molded within a part and, more particularly, to a coated pivot pin/detent assembly molded within a visor for use with a motor vehicle.

2. Description of the Related Art

Traditionally, motor vehicles utilize visors to block or shield an occupant such as a vehicle operator from the sun during operation of the vehicle. The visor is secured to an interior of the vehicle through a pivotal connection enabling the visor to be positioned in any of several positions.

During manufacture of the visor, the pivotal connection, typically a pivot pin/detent assembly, is placed within a visor body. In many cases, the pivot pin/detent assembly is molded in the visor during the formation of the visor. Further, there are a variety of other pivotal or hinged parts or vehicle accessories that are manufactured with the pivot pin/detent assembly molded or formed within the part or accessory. One disadvantage of molding the pivot pin/detent assembly into the part is that during the molding process the molding material used for forming the part invades the void space in the pivot pin/detent assembly due to molding or injection pressures. In these instances, the molding material interferes with the operation and effectiveness of the pivot pin/detent assembly. In some cases, to combat this problem, the pivot pin is removed and replaced with a cap to prevent entry or contamination of the joint by the molding material. Other means to prevent molding material from invading the pivot pin/detent assembly include placing the assembly within a casing or sleeve to prevent contamination or interference by the molding material during the molding process.

A further concern involved in molding a pivot pin/detent assembly within a part or accessory includes the necessity to lubricate the pivot pin/detent assembly. During normal operation, a lubricant, such as grease, facilitates operation of the pivot pin/detent assembly. Use of a lubricant presents a problem when molding; i.e., the lubricant may contaminate the surface of the pivot pin/detent assembly, thereby reducing the bond between the molded part and the pivot pin/detent assembly. While use of a casing or sleeve positioned over the pivot pin/detent assembly provides some protection against contamination by the lubricant, it requires an extra step and thus compounds manufacturing time and cost.

SUMMARY OF THE INVENTION

It is, therefore, one object of the present invention to provide a pivot pin/detent assembly for molding within a molded part or a vehicle accessory typically formed by injection of a urethane foam wherein the coated pivot pin/detent assembly prevents contamination or invasion of the molded material.

An additional object of the present invention is to provide a pivot pin/detent assembly that is self-lubricating when molded within a part or a vehicle accessory.

To achieve the foregoing objects, the present invention is a coated pivot pin/detent assembly. The coating material adheres to the pivot pin/detent assembly and prevents the molding material from entering or interfering with the operation of the pivot pin/detent assembly. Additionally, the coating may be formed of a material that provides lubrication for the pivot pin/detent assembly and traps lubricant within the assembly to eliminate the need for additional or pre-lubrication of the assembly.

A preferred embodiment of the coated pivot pin/detent assembly is used in the manufacture of a visor. Such use includes a pivot pin rotatably secured in a detent mechanism that is capable of maintaining the visor in a selected position. A coating is applied to and adheres to the pivot pin/detent assembly. After curing, the coated pivot pin/detent assembly is placed in a mold cavity. Subsequently, a molding material is injected in a closed pore and/or open pore process and cured to form the finished part or in the preferred embodiment, the visor. The coating prevents the molding material from invading the pivot pin/detent assembly and reducing the effectiveness and operation of the assembly.

One advantage of the present invention is that such a coated pivot pin/detent assembly may be molded into a variety of vehicle accessories while preventing contamination of the assembly during the molding process. Another advantage of the present invention is that, depending upon the type of coating utilized, it may provide a feature of self lubrication for the pivot pin/detent assembly.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
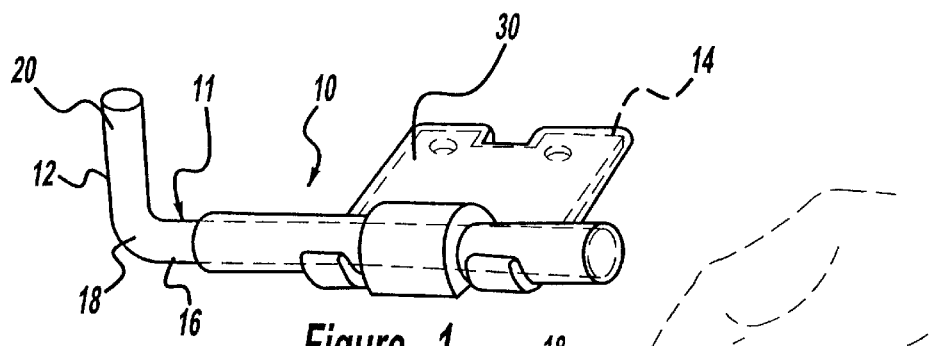
FIG. 1 is a perspective view of a coated pivot pin/detent assembly according to the present invention.
Figure 2:
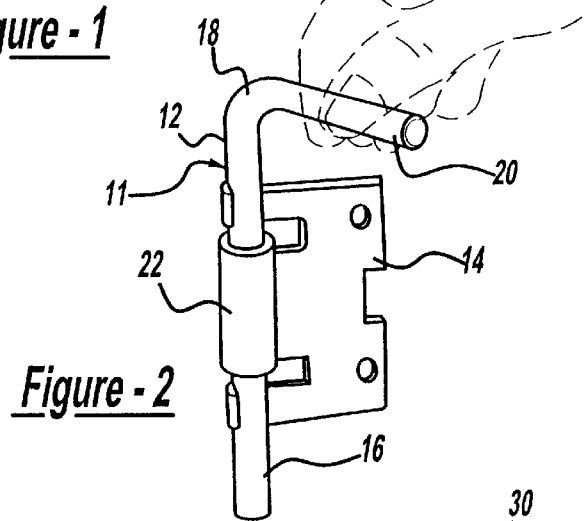
FIG. 2 is a perspective view of a pivot pin/detent assembly prior to application of the coating.

Referring now to the figures, a coated pivot pin/detent assembly 10, according to the present invention, is illustrated in FIGS. 1 and 2. The coated pivot pin/detent assembly 10 includes a pivot pin/detent assembly; generally indicated at 11. The pivot pin/detent assembly 11 includes a pivot pin 12 onto which a detent mechanism 14 is mounted or secured. The pivot pin 12 includes a horizontal segment 16 coupled through an elbow 18 to a vertical segment 20. A mounting bracket (not shown) is attached to the vertical segment 20 of the pivot pin 12 and is used to attached the pivot pin 12 to a stationary point, typically vehicle structure in a motor vehicle. The detent mechanism 14 is attached to the horizontal segment 16 of the pivot pin 12 and operates to move relative to the horizontal segment 16. The detent mechanism 14 includes a substantially cylindrical barrel portion 22 located about the horizontal segment 16. Thus, the detent mechanism 14 may be rotated about the horizontal segment 16 and deployed between first and second positions along with intermediate positions therebetween. The specific structure of the detent mechanism 14 is not further described since such detent mechanisms are well known and other mechanisms could be used with the present invention.

As illustrated in FIG. 1, a coating 30 is applied and adheres to the pivot pin 12 and detent mechanism 14 of the pivot pin/detent assembly 11. Various types of coatings 30 that will cover and adhere to the pivot pin/detent assembly 11 may be used. The coating 30 is of a type having a viscosity that reduces the penetration of the coating 30 into the void space of pivot pin/detent assembly 11. For instance, the coating 30 may be a thermoplastic or elastomeric-type coating. A preferred coating 30 is a hot melt thermoplastic coating that is viscous at a heated temperature. After being placed on the pivot pin/detent assembly 11, the coating 30 cools to form a thickened film or covering that adheres thereto to form the coated pivot pin/detent assembly 10. Such a coating 30 may be a butyrate based hot melt coating such as Peel Coat available from Evans Manufacturing, Inc. Thermoplastic coatings are preferable as the pivot pin/detent assembly 11 may be coated with a liquid coating that solidifies upon cooling. Other types of coatings include an ethyl cellulose and mineral oil coating and a cellulose acetate propionate coating. A particular coating may be used depending upon the desired result. In the preferred embodiment, the identified coatings 30 are advantageous as they are oil-based and provide an oil film. These coatings exude oil and thus provide lubricant to the pivot pin/detent assembly 11. Such coatings eliminate the additional step of lubricating the pivot pin/detent assembly 11.

Other thermoplastic or elastomeric coating materials may be used even though they may not have the capacity to provide lubrication. Use of a non-lubricating coating may require that lubrication be applied before the pivot pin/detent assembly 11 is coated.

Figure 3:
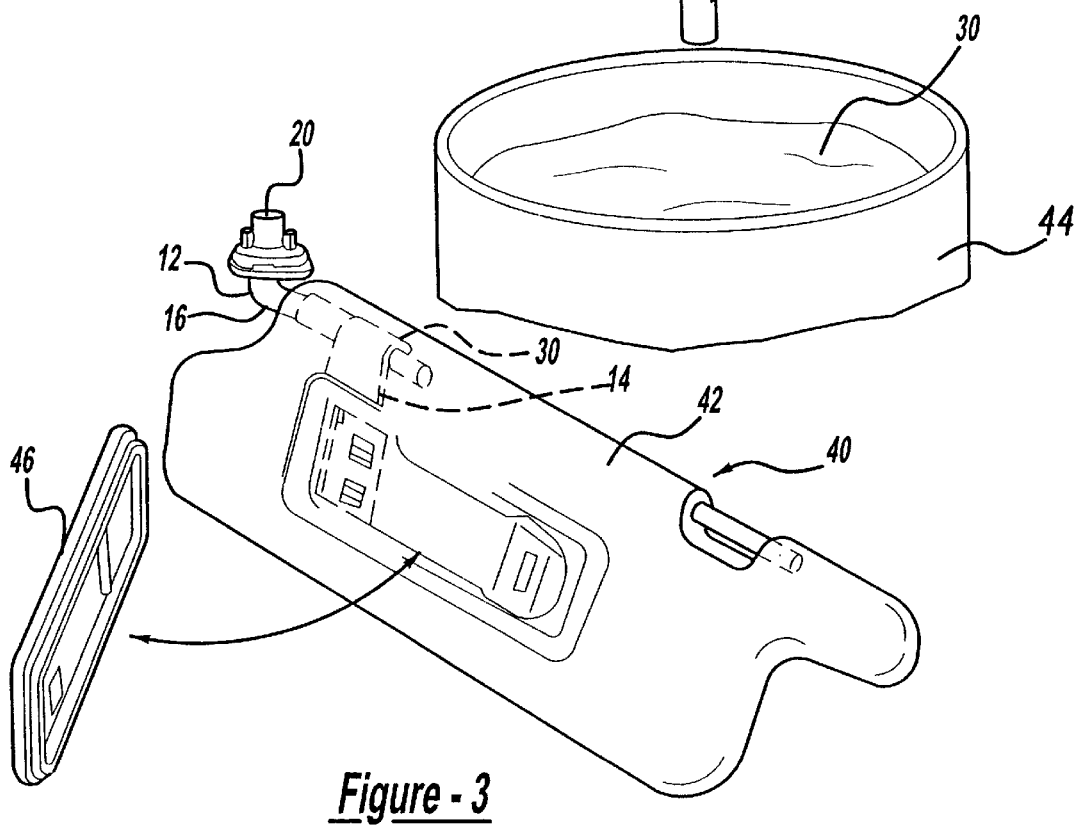
FIG. 3 is a perspective view of a visor molded about a coated pivot pin/detent assembly according to the present invention.

As seen in FIG. 3, the coated pivot pin/detent assembly 10 may be used in the manufacture of a visor 40 such as a sun visor which pivots about the horizontal segment 16 and is attached to a headliner (not shown) of a motor vehicle. Typically, the visor 40 is stored adjacent the headliner of the motor vehicle and may be deployed to a position lowered from the headliner to shield the operator from the sunlight.

As is generally known, a visor body 42 is formed of a rigid foam material. The foam is of a type that is sufficiently rigid to satisfy the structural requirement of the visor 40. Such foams may be any one of several types of open or closed cell foam that have sufficient rigidity, structural integrity and post-molding characteristics to form the visor 40. Such foams are known and therefore will not be described in further detail.

Figure 4:
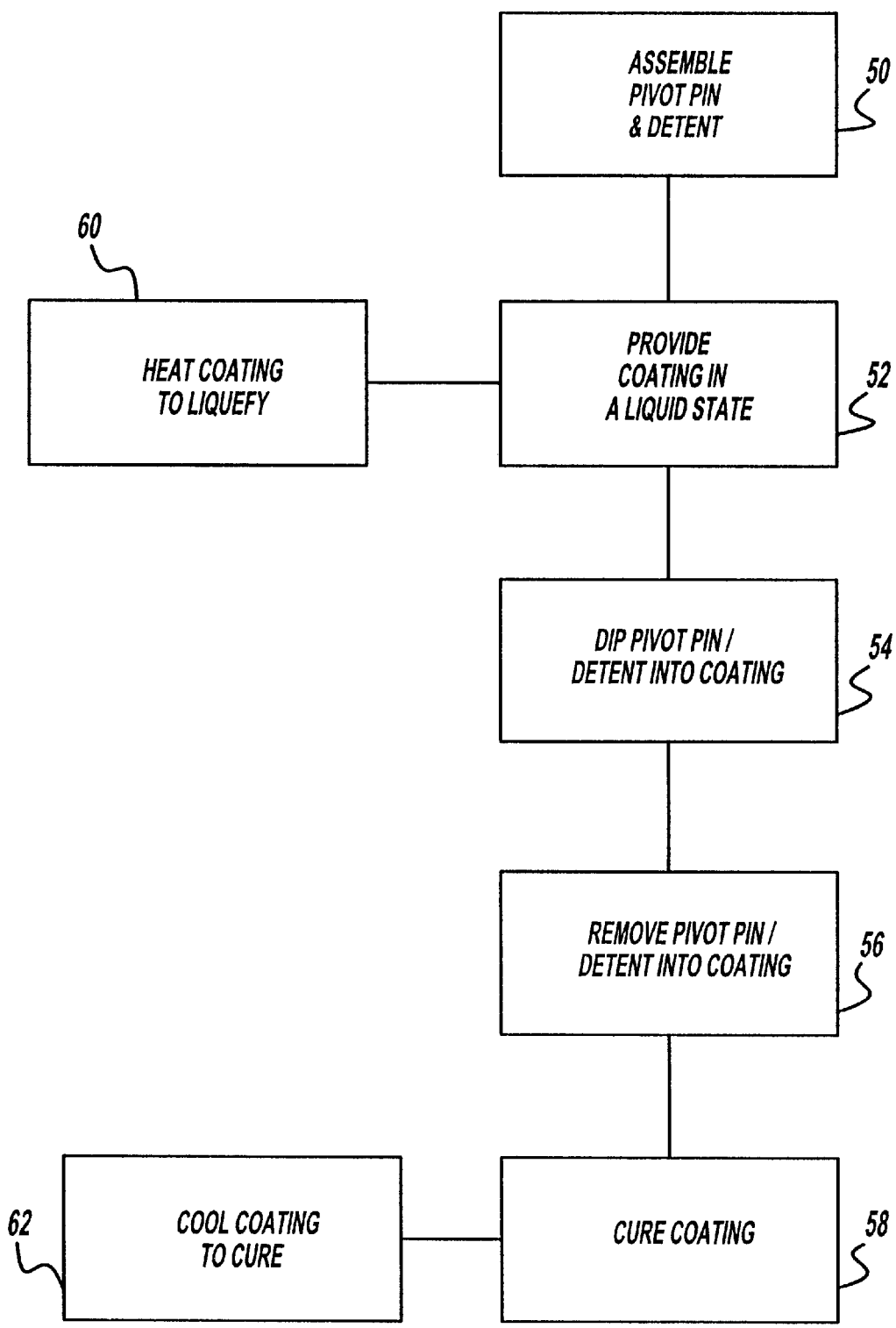
FIG. 4 is a flowchart setting forth the steps to form a coated pivot pin/detent assembly according to the present invention.

Turning to FIG. 4, a method of manufacturing a coated pivot pin/detent assembly 10, according to the present invention is set forth. Initially, at 50, the method includes the step of assembling the pivot pin 12 and detent together to form a single unit or assembly 11. As set forth previously, the detent 14 holds the pivot pin 12 in a first position, a second position and intermediate positions therebetween. After the pivot pin/detent assembly 11 is formed, the coating 30 is applied to and adheres to the pivot pin/detent assembly 11. In the preferred embodiment, the method includes applying the coating 30 by first providing the coating 30 in a liquid state in a container 44, at step 52. The method includes dipping the pivot pin/detent assembly 11 in the container 44 such that the coating 30 covers a portion of the pivot pin/detent assembly 11, at step 54. The method includes removing the coated pivot pin/detent assembly 10 from the container 44, at step 56 and curing the coating 30, at step 58 complete the manufacturing process.

The step of providing the coating in a liquid state 52 may include the step of heating the coating 30 to a temperature of which the coating liquefies 60. Further, the step of curing the coating 58 may include the step of cooling the coating 62 to solidify the coating.

In its preferred form the pivot pin/detent assembly 11 is coated with a thermoplastic coating 30 that provides lubrication to the coated pivot pin/detent assembly 10. When used in the manufacture of a visor 40, the coated pivot pin/detent assembly 10 is placed in a forming die having a cavity therein in a shape conforming to the ultimate shape of the visor 40. The die is then closed and a suitable molding material such as urethane foam is injected into the cavity. As set forth above, the coating 30 prevents the urethane foam from invading or penetrating the pivot pin/detent assembly 11. Once the urethane foam has cured, the entire foamed assembly is removed. Once molded, various components such as a mirror 6 may be attached to the visor 40 and a trim cover or other material may be fitted over the visor body 42. It should be appreciated that a coated pivot pin/detent assembly 10, according to the present invention, both lubricates the assembly during operation and protects the assembly during molding.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pivot pin/detent assembly for pivotally connecting a first member with a second member for movement between a first position and a second position including intermediate positions therebetween comprising:
   a pivot pin;
   a detent for retaining said pivot pin in said first position, said second position and intermediate positions therebetween; and
   a coating adhering to and covering at least a portion of said pivot pin and said detent.

2. A pivot pin/detent assembly as set forth in claim 1 wherein said coating is a hot-melt material.

3. A pivot pin/detent assembly as set forth in claim 1 wherein said coating is formed of a thermoplastic.

4. A pivot pin/detent assembly as set forth in claim 1 wherein said coating is a butyrate based material.

5. A pivot pin/detent assembly as set forth in claim 1 wherein said coating is an ethyl cellulose and mineral oil based material.

6. A pivot pin/detent assembly as set forth in claim 1 wherein said coating is a cellulose acetate propionate based material.

7. A pivot pin/detent assembly as set forth in claim 1 wherein said coating exudes oil after application to said pivot pin/detent assembly, the oil providing lubrication for said pivot pin/detent assembly.

8. A visor or other accessory for a motor vehicle, said visor or other accessory being movable between a stored position and a deployed position, comprising:
   a body made of molded rigid foam;
   a pivot pin having an end molded-in-place at least partially within said body;
   detent means engaging said pivot pin for maintaining said visor or other accessory in the stored position, the deployed position, or an intermediate position between the stored and deployed positions, said detent means being molded-in-place at least partially within said body; and
   a coating conforming to the surface of said detent means and at least part of said pivot pin, preventing said foam from interfering with the operation of said detent means.

9. A visor or other accessory as set forth in claim 8 wherein said coating is plastic.

10. A visor or other accessory as set forth in claim 8 wherein said coating includes a lubricant.

11. A visor or other accessory as set forth in claim 8 wherein said coating provides lubrication for said pivot pin and detent means to facilitate operation of the visor.

12. A pivot pin/detent assembly for pivotally connecting a first member with a second member for movement between a first position and a second position including intermediate positions therebetween comprising;

a pivot pin;

a detent for retaining said pivot pin in said first position, and second position and intermediate positions therebetween; and a coating adhering to and covering at least a portion of said pivot pin and said detent and exuding oil after application to provide lubrication for said pivot pin/detent assembly.

13. A pivot pin/detent assembly as set forth in claim 12 wherein said coating is a hot-melt material.

14. A pivot pin/detent assembly as set forth in claim 12 wherein said coating is formed of a thermoplastic.

15. A pivot pin/detent assembly as set forth in claim 12 wherein said coating is a butyrate based material.

16. A pivot pin/detent assembly as set forth in claim 12 wherein said coating is an ethyl cellulose and mineral oil based material.

17. A pivot pin/detent assembly as set forth in claim 1 wherein said coating is a cellulose acetate propionate based material.

* * * * *